Patented May 24, 1927.

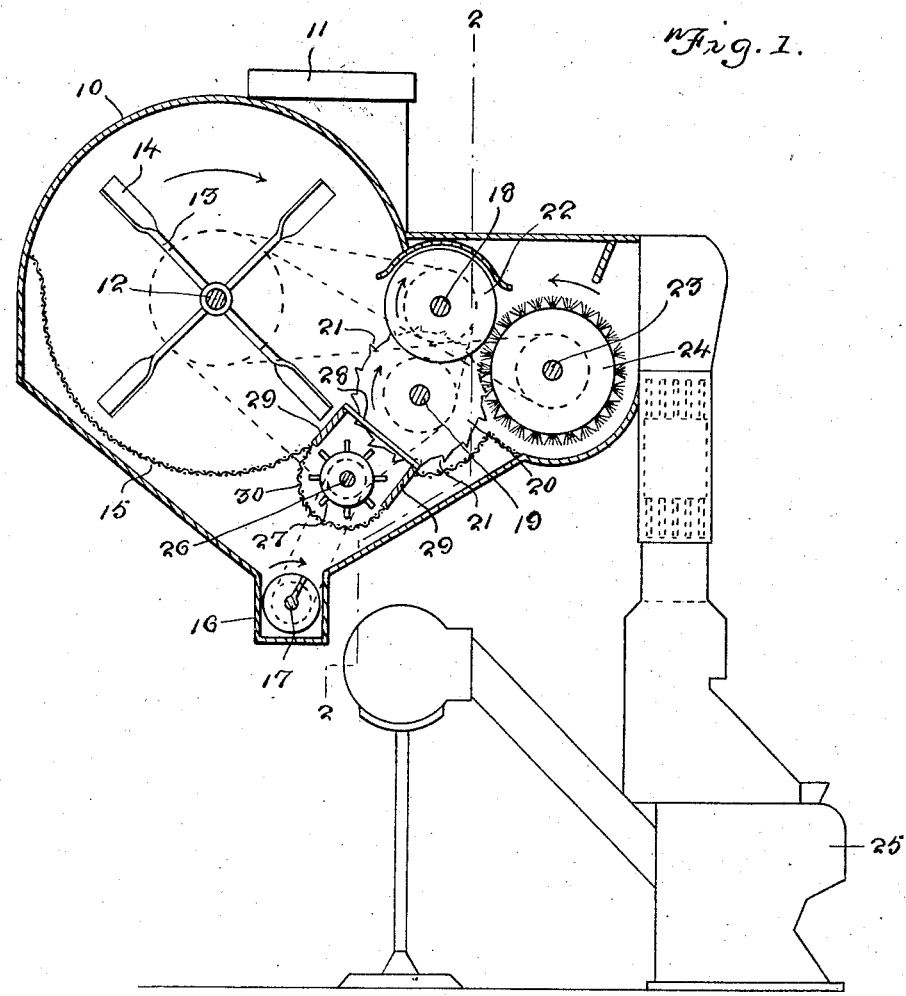

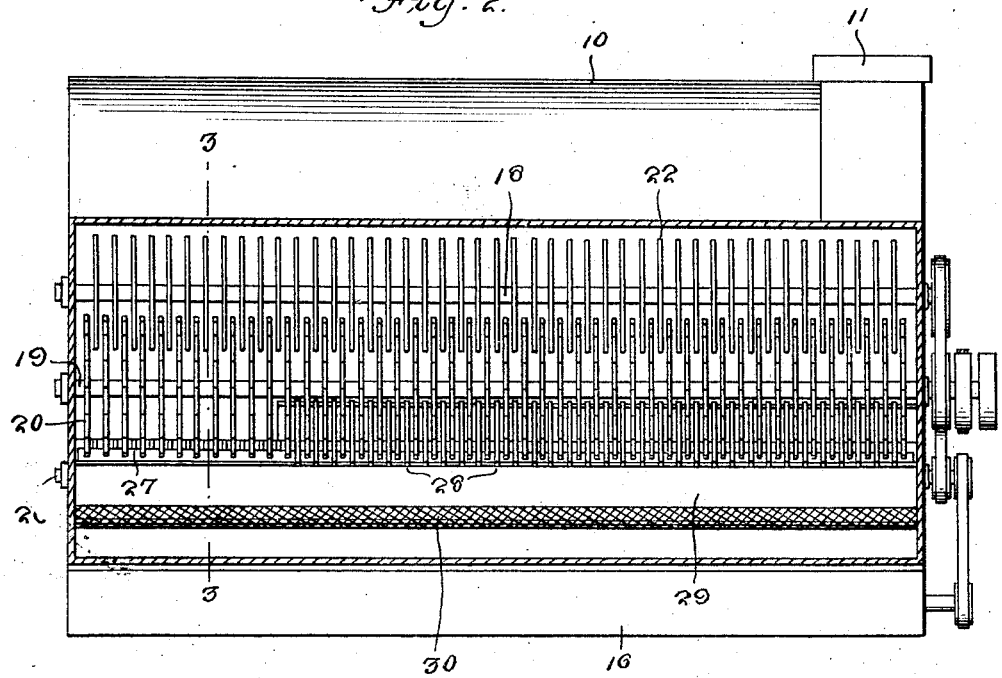
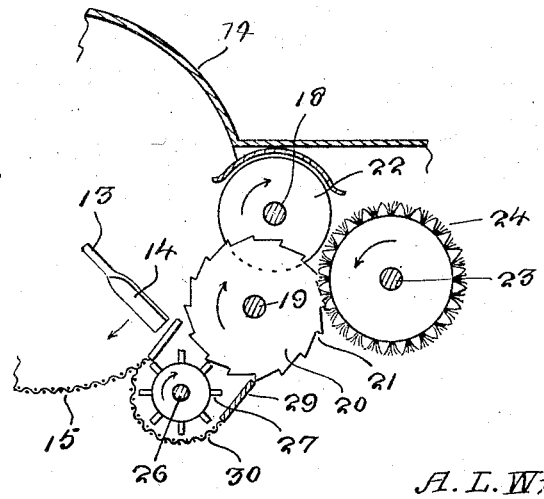

1,630,152

UNITED STATES PATENT OFFICE.

ALVIN LUKE WILLIAMS AND MELFORD OWEN WILLIAMS, OF LUFKIN, TEXAS, ASSIGNORS TO R. B. COZART, OF LUFKIN, TEXAS.

CLEANING MACHINE.

Application filed April 11, 1925, Serial No. 22,382. Renewed March 23, 1927.

This invention contemplates the provision of a machine for cleaning cotton prior to its delivery to a gin, and wherein the cotton is initially subjected to a beating to separate the bolls and dirt therefrom to a marked degree, while the burrs are fed longitudinally through the machine in both directions, and always subjected to the action of a plurality of revolving saws so that all of the cotton is separated from the burrs before the latter are discharged from the machine.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a transverse sectional view through the machine.

Figure 2 is a sectional view taken on line 2—2 of Figure 1.

Figure 3 is a sectional view taken on line 3—3 of Figure 2.

Referring to the drawings in detail, 10 represents a casing which may be of any suitable size and cross sectional contour, without departing from the spirit of the invention. Communicating with this casing at one end thereof, is a hopper 11 through which the cotton passes into the casing 10. Journalled within the casing 10 and arranged longitudinally thereof is a shaft 12, and mounted on this shaft is a plurality or series of arms 13, which are arranged in spiral formation, the arms being of equal length and having their outer ends offset and flattened as indicated at 14. These arms are utilized to initially subject the cotton to a beating operation, with a view to separating the dirt and other foreign matter therefrom, which dirt and foreign matter falls upon a screen 15, through which it passes into the bottom 16 of the casing which is of channel like formation in cross section as shown in Figure 1. A spiral like conveyor 17 operates in this channel, and is used to carry or convey the dirt and other foreign matter through the machine to a discharge opening at one end thereof, which opening is not herein shown.

Also journalled in the casing to one side of the shaft 12 are spaced parallel shafts 18 and 19 respectively, and these shafts are mounted to rotate in the same direction as the shaft 12, being suitably connected therewith by a suitable arrangement of belts and pulleys as indicated at the right of Figure 2. Mounted upon the shaft 18 is a series of saws 20, the saws being of disk like formation and formed with extraordinary coarse teeth 21. These saws are equidistantly spaced apart on the shaft 19, and are of a diameter to project within that part of the casing in which the beater arms 13 operate. Consequently, the arms 13 beat the cotton against the saws 20 as the initial step of the cleaning operation. Fixed upon the shaft 19 is a plurality of spaced disks 22 which operate between the adjacent saws 20, and the relative arrangement of the disks and saws are clearly shown in Figure 1. Also journalled in the casing to one side of the shafts 18 and 19 respectively is a shaft 23 which supports a brush 24 which rotates in the direction of the saws and disks as indicated by the arrow in Figure 1. This brush takes the cotton from the saw teeth, and conveys it to the belt distributor, which in turn carries the cotton to the gin 25.

Journalled in the casing and beneath the shaft 18 is a spiked conveyor including a shaft 26, the spikes 27 being arranged in spiral formation on the shaft 26, and of a length to pass directly beneath the teeth 21 of the saw 20. The purpose of this conveyor is to feed the burrs longitudinally through the machine in a direction opposite from that in which they are fed by means of the spiral beater arms 13 so as to reclean the burrs, and completely separate therefrom any cotton that might not have been extracted from the burrs while the latter were being fed through the machine by the arms 13. Arranged above the spiral conveyor is a plurality of spaced parallel bars 28 which are connected with side wall 29 to define therewith a box like structure to hold the burrs associated with the spiral conveyor, while the saws 20 pick the cotton therefrom. Arranged beneath the spiked conveyor is a screen 30 through which the dirt and foreign matter falls into the channel like bottom 16 from where it is carried from the machine by means of a conveyor 17.

In practice, the cotton is initially deposited in the casing 10 through the hopper 11, and at one end of the machine. The spiral beater arms 13 beat the cotton against the saws 20 to separate the dirt and other foreign matter therefrom, and also feed the cotton longitudinally through the casing from one to the other end thereof. During this operation a considerable quantity of cotton is picked from the burrs by the saws 20, and is carried by the saws and disks 22, in the direction of the brush 24, and inasmuch as this brush rotates in the direction opposite to the direction of rotation of the said saws and disks, the brush takes the cotton from the saws and delivers it to the distributing belt of the gin. While the cotton is being fed in the direction just mentioned, and subjected to the beating operation of the arms 14, the bolls are torn to pieces between the teeth of the saw and the arms 13. Of course, the disks 22 are closely related to the saws 20 and assist the latter in pulling the cotton from the burrs and also from that part of the casing in which the cotton is initially deposited. The burrs however, are prevented from passing between the saws and disks, the saws kicking or knocking the burrs back into that part of the casing in which they were initially deposited, and after the burrs reach the very end of the casing, as compared to the location of the hopper 11, the burrs enter the box like structure above defined and in which the spiked conveyor operates. This conveyor then feeds the burrs in an opposite direction longitudinally through the casing to subject the burrs to a recleaning operation, and while the burrs are moving in this direction, they are again subjected to the action of the saws 20 which extract all of the cotton therefrom, pulling the cotton between the spaced parallel bars 28 which hold the burrs associated with the spiked conveyor for the purpose mentioned. As the burrs reach the end of the spiked conveyor in their direction of travel, they are discharged from the machine through a suitable opening therein, not shown. It will be noted that the beater arms 13, saws 20, disks 22, the spiked conveyor, and the conveyor 17 in the lower end of the machine are rotated in one direction as indicated by the arrows in Figure 1, while the brush 24 rotates in an opposite direction for the purpose above mentioned.

While it is believed that from the foregoing description, the nature and advantages of the invention will be readily apparent, we desire to have it understood that we do not limit ourselves to what is herein shown and described and that such changes may be resorted to when desired as fall within the scope of what is claimed.

Having thus described the invention, we claim:

1. A cotton cleaning machine comprising a casing, a hopper communicating therewith adjacent one end thereof, a conveyor operating within the casing for feeding the cotton longitudinally thereof, said conveyor including a plurality of spirally arranged beater arms, a series of spaced rotating saws against which the cotton is beaten by said arms, a series of rotating disks operating between the saws and cooperating therewith to extract the cotton from the burrs, means whereby the conveyor and said saws and disks are rotated in one direction, and means for removing the cotton from the saws onto the belt of a gin.

2. A cotton cleaning machine comprising a casing, a hopper communicating therewith adjacent one end thereof, a conveyor operating within the casing for feeding the cotton from one end to the other of said casing, said conveyor including a plurality of spirally arranged beater arms, a series of spaced rotating saws against which the cotton is beaten by said arms to remove the dirt and other foreign matter from the cotton and to break up the bolls, a series of rotating disks operating between the saws and cooperating therewith to extract the cotton from the burrs, a brush mounted for rotation and adapted to remove the cotton from the saws onto the belt of a gin, and means for rotating the conveyor, saws and disks in one direction, and said brush in an opposite direction.

3. A cotton cleaning machine comprising a casing, a hopper communicating therewith adjacent one end thereof, a conveyor operating within the casing for feeding the cotton longitudinally thereof, said conveyor including a plurality of spirally disposed beating arms, a series of spaced rotating saws against which the cotton is beaten by said arms to separate the dirt and foreign matter therefrom and to break up the bolls, a screen arranged beneath the conveyor and through which the dirt and foreign matter passes, a series of rotating disks operating between the saws and cooperating therewith to extract the cotton from the burrs, a spiral conveyor operating in the bottom of said casing for removing the dirt and other foreign matter from the casing, said conveyors, saws and disks rotating in the same direction, and a brush arranged behind said saws for rotation in an opposite direction, and utilized to remove the cotton from the saws onto the belt of a gin.

4. A cotton cleaning machine comprising a casing, a hopper communicating therewith adjacent one end thereof, a conveyor operating within the casing for feeding the cotton from the hopper toward the other end of the casing, said conveyor including a plurality of spirally disposed beater arms, a series of spaced rotating saws against which the cotton is beaten by said arms to separate the dirt and foreign matter therefrom and to break the bolls, a series of rotating disks operating between the saws and cooperating therewith to extract the cotton from the burrs, means for feeding the burrs longitudinally of the casing in an opposite direction and along the bottom of said saws for a recleaning operation, said conveyor, saws and disks rotating in the same direction, and a brush arranged behind and parallel with the saws for rotation in an opposite direction, and utilized to remove the cotton from the saws.

5. A cotton cleaning machine comprising a casing, a hopper communicating therewith adjacent one end thereof, a conveyor operating within the casing for feeding the cotton from the hopper in the direction of the other end of said casing, said conveyor including a plurality of spirally arranged feeder arms, a series of spaced rotating saws against which the cotton is beaten to remove the foreign matter therefrom and to break up the bolls, a screen arranged beneath the conveyor and through which the foreign matter passes onto the bottom of the casing, said bottom including a channel like portion in cross section, a spiral conveyor operating in the channel like portion for removing the foreign matter from the casing, a series of spaced rotating disks operating between the saws and cooperating therewith to extract cotton from the burrs, means for feeding the burrs longitudinally of the machine in an opposite direction and along the lower edges of said saws for a recleaning operation, said conveyors, saws and disks rotating in the same direction, and a brush arranged behind and parallel with said saws for removing the cotton therefrom.

6. A cotton cleaning machine comprising a casing, a hopper communicating therewith adjacent one end thereof, a conveyor operating within the casing for feeding the cotton longitudinally within the casing in one direction, said conveyor including a plurality of spirally arranged feeder arms, a series of spaced rotating saws against which the cotton is beaten by said arms for separating the foreign matter therefrom and breaking up the bolls, a series of spaced disks operating between the saws and cooperating therewith to extract the cotton from the burrs, a box like casing arranged beneath said saws and to which the burrs are delivered by said conveyor, a spiked conveyor operating in said box like casing for feeding the burrs longitudinally of the machine in an oppostie direction, and against the lower edges of said saws for a recleaning operation, said saws operating through the top of said box like casing to extract the cotton still clinging to the burrs, a spiral conveyor operating along the bottom of the machine for removing the dirt and foreign matter therefrom, said conveyors, saws and disks rotating in the same direction and a brush arranged at the rear of said saws and rotating in an opposite direction to remove the cotton from said arms.

In testimony whereof we affix our signatures.

ALVIN LUKE WILLIAMS.
MELFORD OWEN WILLIAMS.